United States Patent [19]

Woods

[11] Patent Number: 4,918,917
[45] Date of Patent: Apr. 24, 1990

[54] LIQUID COOLED EXHAUST FLANGE

[76] Inventor: Woodrow E. Woods, 3640 Fiscal Ct., Riviera Beach, Fla. 33404

[21] Appl. No.: 354,883

[22] Filed: May 22, 1989

[51] Int. Cl.$^5$ .................................. F02B 37/00
[52] U.S. Cl. ............................ 60/320; 60/280; 60/605.1
[58] Field of Search .............. 60/310, 320, 321, 280, 60/605.1

[56] References Cited

U.S. PATENT DOCUMENTS

| | | | |
|---|---|---|---|
| 2,608,818 | 9/1952 | Shelley | 60/320 |
| 3,620,008 | 11/1971 | Newbold | 60/280 |
| 4,068,612 | 1/1978 | Meiners | 60/605.1 |
| 4,147,467 | 4/1979 | Liecht | 60/605.1 |
| 4,503,683 | 3/1985 | Wood | 60/605.1 |

Primary Examiner—Douglas Hart
Attorney, Agent, or Firm—Malin, Haley, McHale, DiMaggio & Crosby

[57] ABSTRACT

A water jacketed exhaust flange for reducing the exposed area between the exhaust outlet of a turbo charger turbine and the water jacketed exhaust pipe members. The water cooled flange is connected between the water jacketed exhaust conduit system and the turbo charger exhaust gas discharge port so as to provide exhaust conduit cooling right up to the turbo charger/exhaust conduit interface. The flange is comprised of a generally cylindrical flange element adapted to connect the exhaust conduit system with the outlet of the turbo charger exhaust gas turbine discharge port, said flange having a concentric water jacket housing defining an annular volume between said water jacket housing and said cylindrical flange adapted to receive in heat transfer relationship a flow of circulating cooling water.

4 Claims, 2 Drawing Sheets

LIQUID COOLED EXHAUST FLANGE

BACKGROUND OF THE INVENTION

1. Field of the invention

This invention relates to water cooled exhaust systems and more particularly relates to a water-jacketed exhaust flange for reducing the exposed area between the exhaust outlet of a turbo charger turbine and the water-jacketed exhaust pipe members.

2. Prior Art

It is well-known that the temperature of the exhaust gas discharged from the exhaust gas outlet of a conventional internal combustion engine turbo charger unit is extremely high, sometimes in the range of 800-1200 degrees Fahrenheit. For this reason, it has become commonplace to surround the exhaust tubing downstream of the turbo charger exhaust gas outlet with a water circulating jacket assembly for transferring heat from the exhaust tube. Typically, the outside surface temperature of the water-jacketed exhaust pipe is on the order of only about 10 degrees Fahrenheit warmer than the ambient inlet water temperature used for cooling within the water-jacket. Such a substantial decrease in the exposed temperature of the exhaust conduit reduces the ambient temperature in the vicinity of the internal combustion engine (e.g.: in the engine room of a marine vessel). More importantly, such a reduced temperature exhaust conduit will not cause injury in the event of accidental contact with the skin.

Another means for reducing the exposed temperature of exhaust conduit is by blanketing same with a low heat transfer coefficient material, such as fiberglass covered with a flexible reflective material. Although such material would generally result in a reduction in the exposed temperature commensurate to the above-referenced water-jacketing, such blanketing material has the substantial tendency to become saturated with engine oil, diesel fuel and other liquids thereby becoming a serious fire hazard by virtue of being soaked with flammable materials and exposed to extremely high temperatures.

Although water-jacketed and thus cooled exhaust conduit systems have largely replaced such "dry" or blanketed systems, on such water cooled exhaust systems the area between the exhaust outlet of the turbo charger turbine and the beginning of the jacketed portion of exhaust conduit represents a serious safety hazard due to its temperature being on the order of magnitude of the exhaust gas temperature which, as mentioned above, can range between 800 and 1200 degrees Fahrenheit. The incidence of serious injury resulting from accidental contact with this relatively small area is alarmingly high. It is therefore highly desirable to eliminate this source of health hazard as well as to eliminate the source of unnecessary heat by means of a relatively simple and inexpensive article which can be built into the overall engine/exhaust system.

SUMMARY OF THE INVENTION

To overcome the above described shortcomings caused by the high temperature associated with the exhaust gas emanating from the outlet of an internal combustion engine turbo charger, it is herein proposed to provide a water-cooled flange connected between the water jacketed exhaust conduit system and the turbo charger exhaust gas discharge port so as to provide exhaust conduit cooling right up to the turbo charger/exhaust conduit interface. To this end, there is herein disclosed a water cooled flange comprised of a generally cylindrical flange element adapted to connect the exhaust conduit system with the outlet of the turbo charger exhaust gas turbine discharge port, said flange having a concentric water jacket housing defining an annular volume between said water-jacket housing and said cylindrical flange adapted to receive in heat transfer relationship a flow of circulating cooling water. Said water-jacket housing is adapted to connect in water-tight engagement a water-jacket housing which is in concentric relation about at least a portion of the remainder of the exhaust conduit system. Said flange is constructed to mate within the pilot bore of the turbo charger turbine housing on its upstream side and with the water-jacketed exhaust gas conduit on its downstream side. The exterior of said flange flares outwardly when on moves from the upstream toward the downstream end thereof, said flare being caused by the water-jacket housing creating said annular volume. The flange may be provided with a series of removably sealable aperture means for providing access to the interior (exhaust flow volume) of the exhaust flange to allow testing apparatus, bleed valves, etc. to communicate with the volume between the exhaust conduit system and the turbo charger. Such apertures, or test ports, are as commonly used in the art.

The magnitude of said annular volume is intended to be maximized with respect to the overall size of the flange in the axial direction so as to minimize as much hot area as possible between the turbo charger and the water-cooled exhaust conduit. As previously noted, an exposed, uncooled, section in the flange area has proved hazardous during engine operation due to burns sustained by personnel contacting the hot area of the exhaust flange.

Said test ports provide means for pressure testing, pyrometer probes, or any other test instrument or gauge unit that uses exhaust pressure or temperature as a measurement parameter. The test port areas are preferably recessed into the water jacketed area in order to provide a non-protruding area so as to prevent injury due to snagging on clothing or personnel extremities.

As corrosion is a major consideration with respect to internal combustion engine exhaust systems, particularly in the marine environment, the flange is preferably comprised of material that will withstand high temperature and resist deterioration by salt water and/or microbial action.

The herein described exhaust flange preferably has a turbo charger pilot bore contact surface comprised of a series of concentric serrations to create as efficient and complete a seal against exhaust leakage as possible. These serrations consist of concentric grooves cut into the surface of the flange that contacts the inner seal area of the turbo charger exhaust gas discharge port.

DETAILED DESCRIPTION OF THE PREFERRED EMBODIMENT

Figure 1:
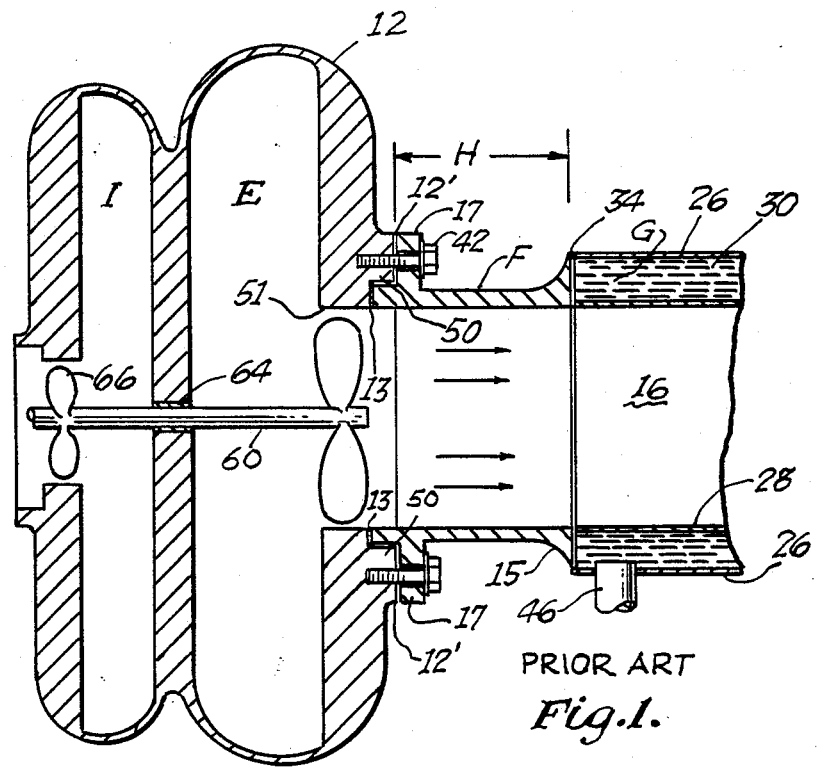
FIG. 1 is a cross-sectional view showing a typical prior art exhaust conduit/turbo charger mating flange lacking a water-jacket housing.

Referring now to the drawings, FIG. 1 shows a typical prior art embodiment disclosing a non-water cooled flange F in sandwiched relationship between turbo charger turbine housing 12 and water-jacketed exhaust conduit 16. Flange F is generally cylindrical and coincides with the outlet port of the exhaust side (E) of turbo charger 12 and the inlet side of water-jacketed exhaust conduit 16. The upstream end of said flange F abuts within the pilot bore 50 of turbo charger housing 12 in sandwiching relationship with a sealing means such as gasket 13. A circular shaped peripheral web member 17 is integrally connected to flange F and provides a stable interconnection between said flange F and flange facing surface 12' of turbo charger housing 12. Bolts 42 are used to removably secure flange F to housing 12. The downstream edge of flange F abuts said water-jacketed exhaust conduit 16 in sealing engagement by means of gasket G sandwiched therebetween and weld 34. Water-jacketed conduit 16 is comprised generally of an outer wall 26, an inner wall 28, and an annular water-jacket volume 30 adapted to provide a space within which cooling water can be circulated to draw heat out of inner conduit 28, of exhaust conduit 16 and to thereby reduce the overall thermal energy of said conduit 16. Therefore, a person coming into contact with said water-jacketed conduit 16 during operation of the internal combustion engine to which said turbo charger is connected will not be burned. However, such is not the case should someone inadvertently come into contact with flange F. The area designated by letter H indicates an area of high thermal energy during operation of said internal combustion engine which the instant invention eliminates.

Water-jacketed conduit 16 is preferably equipped with a water inlet connectable to a supply of circulating cooling water. Turbine housing 12 houses a pair of impellers 62 and 66 each mounted near opposite ends of a rotatable shaft 60, in the ordinary fashion. Said shaft 60 preferably rotates within a sealing bearing means 64.

Figure 3:
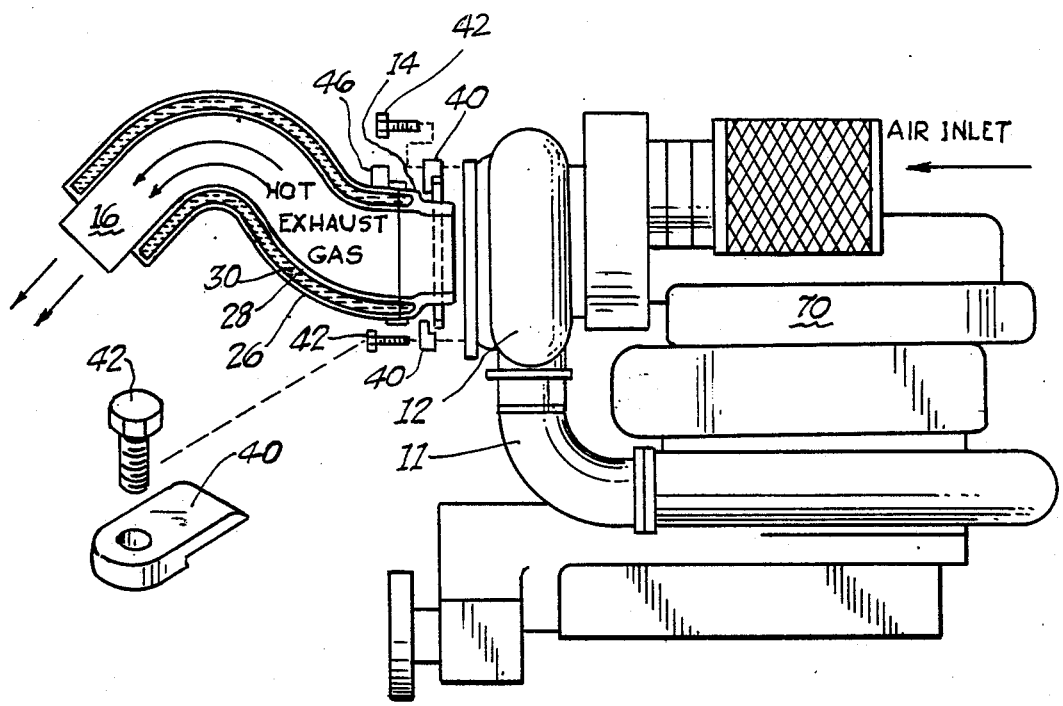
FIG. 3 shows an elevational view of a typical turbo charged internal combustion engine apparatus utilizing the water-jacketed flange of the instant invention in combination with a water-jacketed exhaust conduit system.
Figure 4:
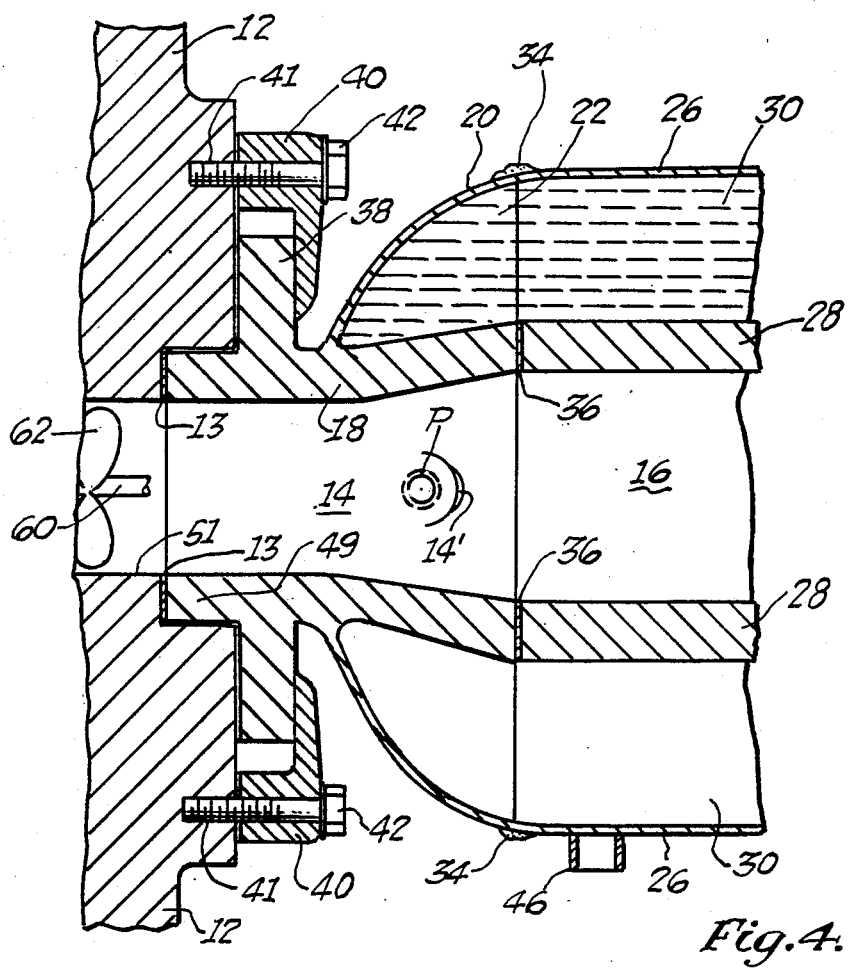
FIG. 4 is a detail of the water-jacketed exhaust flange mounting structure.
Figure 2:
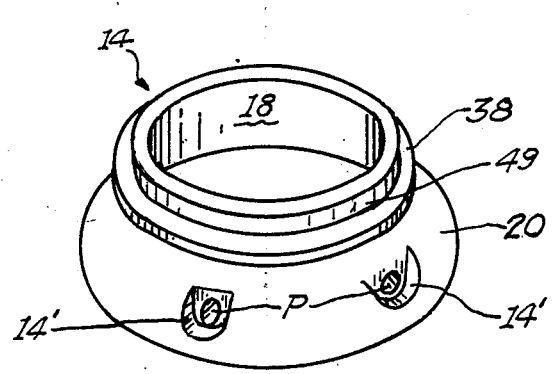
FIG. 2 shows a perspective view of the water-jacketed flange of the instant invention.

In order to eliminate high temperature area H, shown in FIG. 1, the instant invention, shown in FIGS. 2 through 4, comprises a water-jacketed mating flange 14 adapted to fluidly communicate exhaust outlet 19 of turbo charger housing 12 with the interior of water cooled, or jacketed, exhaust conduit 16. Said flange 14 is comprised of an outer flared water-jacket housing surface 20 integrally connected to an internal generally cylindrical conduit section 18. Said water-jacket housing surface 20 is arranged concentrically about said internal conduit section 18 and is adapted to abut sealingly with outer wall 26 of water-jacketed conduit 16 so as to provide a water tight annular volume or water circulation compartment 30 by virtue of inner sealing gasket 36 being sandwiched between internal conduit section 18 and concentric internal conduit section 28 of exhaust conduit 16. A disk shaped web member 38 is integrally connected in concentric relationship about said flange 14, in particular about the downstream edge of pilot 49. Pilot 49 is adapted to be disposed within pilot bore 50 of turbo charger housing 12.

Flange 14 is held in abutting relationship against turbo charger housing 12 by virtue of a plurality of L-shaped securing means 40 as best shown in FIG. 4. Bolts 42 are received through an elongated cylindrical aperture in said securing means 40 and mate in threaded engagement with internally threaded bore 41 disposed in housing 12.

In order to further reduce the aggregate temperature emitted by the turbo charger/exhaust conduit system, turbo charger housing 12 is preferably of a water cooled variety.

As can best be seen in FIG. 4, the area of contact with a non-water-cooled section of exhaust conduit is eliminated entirely, thereby increasing the safety factor dramatically. The decreased temperature of the exposed exhaust conduit apparatus enhances the safety of the system both from a skin burn point of view as well as a fire safety point of view.

Shown in FIG. 3 is the flange of the instant invention shown connected to a turbo charged internal combustion engine 70. Engine exhaust manifold 11 expels exhaust gases arising from the combustion process into turbo charger exhaust gas turbine housing portion E which in turn imparts rotational energy to turbine impeller 62 which in turn rotates turbine shaft 60. Said exhaust gases are expelled thereafter through exhaust discharge outlet 51 of housing 12 into interior of flange 14 and thereafter through exhaust water-jacketed conduit 60.

It is specifically contemplated herein that although water is identified as a heat exchange medium, any fluid appropriate for performing the cooling function may be used, and the use of the term "water" is for purposes of example only and not intended to limit the scope of disclosure.

The instant invention has been shown and described herein in what it is considered to be the most practical and preferred embodiment. It is recognized, however, that departures may be made therefrom within the scope of the invention and that obvious modifications will occur to a person skilled in the art.

What is claimed is:

1. A liquid-cooled exhaust flange for mating a liquid-jacketed exhaust conduit system to a conventional internal combustion engine turbo charger discharge port, comprising:
    a generally cylindrical elongated exhaust conduit member adapted to mate in sandwiched relationship between said turbo charger housing and said liquid-jacketed exhaust conduit system;
    a cooling liquid-jacket housing integrally and concentrically connected to said exhaust conduit member adapted to mate in fluidly communicating relationship with a flow of cooling liquid within said liquid-jacketed exhaust conduit system;
    said liquid-jacket housing covering a substantial portion of the external surface area of said exhaust conduit member so as to reduce the temperature of the external surface of said exhaust flange.

2. The liquid-cooled exhaust flange of claim 1, further comprising means for releasably connecting said flange to said turbo-charger housing.

3. The liquid-cooled exhaust flange of claim 2, wherein said means for connecting are comprised of a plurality of L-shaped finger members oriented so that the upstanding leg portion of said L contacts an annular web member integrally connected to said exhaust conduit member and the horizontally disposed segment of said L adapted to receive a threaded bolt, said bolt adapted to be received in threading engagement within a corresponding internally threaded cylindrical recess defined by said turbo charger housing.

4. An internal combustion engine exhaust conduit system adapted to receive exhaust gas discharging from a turbo charger turbine housing, comprising:
   an liquid-jacketed exhaust gas conduit having an internal exhaust gas carrying tube and a slightly larger concentric liquid-jacket spaced from said exhaust gas tube, thereby defining an annular liquid-jacket adapted to receive a flow of circulating cooling liquid therein;
   a liquid-jacketed exhaust gas flange adapted to be partitioned and to fluidly communicate said discharge port of said turbo charger housing and said exhaust gas tube, said liquid-jacketed flange having an internal exhaust gas tube generally conforming to the dimensions of said exhaust gas tube of said liquid-jacketed exhaust conduit, said flange further having an integrally connected concentrically mounted liquid-jacket member slightly spaced from said internal exhaust conduit segment and thereby defining an annular volume therebetween generally corresponding to said annular volume of said exhaust gas conduit adapted to receive said flow of circulating cooling liquid;
   said annular volume of said flange and said annular volume of said exhaust gas conduit being in sealed fluid communication one with the other;
   means for circulating a flow of cooling liquid within said annular volumes associated with said exhaust gas conduit.

* * * * *